(12) United States Patent
Cornellier et al.

(10) Patent No.: US 11,535,016 B2
(45) Date of Patent: Dec. 27, 2022

(54) PERFORATED POLYMERIC SHEET WITH UNDERLYING SPACERS

(71) Applicant: SOLMAX INTERNATIONAL INC., Montreal (CA)

(72) Inventors: Mathieu Cornellier, Varennes (CA); Jean-Louis Vangeluwe, Montreal (CA); Vincent Guillette, Vercheres (CA); Louis Pare, St-Joseph de Coleraine (CA)

(73) Assignee: Solmax International Inc., Varennes (CA)

( * ) Notice: Subject to any disclaimer, the term of this patent is extended or adjusted under 35 U.S.C. 154(b) by 0 days.

(21) Appl. No.: 16/634,977

(22) PCT Filed: Sep. 12, 2018

(86) PCT No.: PCT/CA2018/051129
§ 371 (c)(1),
(2) Date: Jan. 29, 2020

(87) PCT Pub. No.: WO2019/051592
PCT Pub. Date: Mar. 21, 2019

(65) Prior Publication Data
US 2020/0238675 A1 Jul. 30, 2020

Related U.S. Application Data

(60) Provisional application No. 62/557,263, filed on Sep. 12, 2017.

(51) Int. Cl.
*B32B 27/32* (2006.01)
*E04D 13/076* (2006.01)
(Continued)

(52) U.S. Cl.
CPC ............ *B32B 27/32* (2013.01); *E04D 13/076* (2013.01); *B32B 38/04* (2013.01); *B32B 2250/24* (2013.01);
(Continued)

(58) Field of Classification Search
CPC .............. B32B 27/32; B32B 2323/043; B32B 2307/72; B32B 2250/24; B32B 38/04; F16L 1/11; F16L 57/06
See application file for complete search history.

(56) References Cited

U.S. PATENT DOCUMENTS

| 3,503,097 | A | * | 3/1970 | Paul, Jr. | .................... | B26F 1/06 |
| | | | | | | 425/290 |
| 5,084,352 | A | * | 1/1992 | Percec | .................... | B32B 27/08 |
| | | | | | | 428/412 |

(Continued)

FOREIGN PATENT DOCUMENTS

CN            02713041 A     10/2012

OTHER PUBLICATIONS

Chinese Office Action dated May 14, 2021 and translation.

*Primary Examiner* — Ellen S Hock
(74) *Attorney, Agent, or Firm* — Wood, Phillips, Katz, Clark & Mortimer (57) ABSTRACT

A new protective polymeric sheet is described wherein said polymeric sheet includes perforations and attached spacers that allow air and water circulation when the sheet is in use. The sheet protects underlying structures from damage while ensuring moisture migration between the protective polymeric sheet and the underlying structure. The protective polymeric sheet comprises a plurality of perforations extending through the sheet and a plurality of spacers, each spacer extending from a lower surface of the sheet adjacent to one side of each perforation. The spacers are created during perforation of the polymeric sheet. The protective (Continued)

polymeric sheet is useful in a number of applications, including without limitation: to protect pipelines; to replace geotextiles in heap leach processes; to line sandboxes and paving stones; to cover greenhouse floors; to make industrial or residential gutter caps; and as a filter.

20 Claims, 7 Drawing Sheets

(51) Int. Cl.
    *B32B 38/04*     (2006.01)
    *F16L 58/10*     (2006.01)
    *F16L 58/16*     (2006.01)

(52) U.S. Cl.
    CPC ..... *B32B 2307/72* (2013.01); *B32B 2323/043* (2013.01); *F16L 58/1063* (2013.01); *F16L 58/16* (2013.01)

(56) References Cited

U.S. PATENT DOCUMENTS

| | | | |
|---|---|---|---|
| 7,390,553 B2 * | 6/2008 | Muth | A61F 13/512 428/132 |
| 8,563,114 B2 | 10/2013 | Manninen | |
| 2016/0327185 A1 * | 11/2016 | Work | H02G 9/025 |

* cited by examiner

PERFORATED POLYMERIC SHEET WITH UNDERLYING SPACERS

CROSS-REFERENCE TO RELATED APPLICATIONS

The present patent application claims the benefit of priority of commonly assigned U.S. Patent Application No. 62/557,263 entitled "Perforated Polymeric Sheet with Attached Underlying Spacers, Methods of Making the Same and Their Use for The Protection of Underlying Structure" filed with the USPTO on Sep. 12, 2017.

FIELD OF THE INVENTION

The present invention generally relates to polymeric sheets (membranes), and more particularly to polymeric sheets with underlying spacers, preferably used for the protection of underlying structures such as, but not limited to, pipelines.

BACKGROUND OF THE INVENTION

U.S. Pat. No. 4,213,486 (Coated Pipe and Process for making same—1980) discloses a steel pipe with an external protective coating by first applying a corrosion protective coating of fused powdered epoxy resin adhered to the pipe, then applying (e.g. as by wrapping sheet) an outer polyolefin layer directly onto the corrosion protected coating. The outer sheet of polyolefin is provided with a pressure-sensitive adhesive or a hot melt adhesive which adhesive may also be reactive with the epoxy coating (e.g. one having free carboxyl group such as ethylene acrylic acid copolymer). The polyolefin is preferably polyethylene or polypropylene and most preferably polyethylene. Either high- or low-density polyolefin may be used. Polyolefin sheet prevents cathodic protection of the steel pipe as it insulates the pipe from the ground, preventing electron migration to prevent corrosion.

U.S. Pat. No. 5,713,392 (Low Friction Slip-Sleeve Pipe Wrap—1998) discloses a low friction slip-sleeve wrap for buried structures such as pipelines, pilings or the like. The pipe is coated in a polymer coating such as HDPE or FBE, then wrapped in a polymer mesh such as geonet or geogrid without any friction-increasing means such as friction coatings or filings or bonding of layers. Finally, a layer of geotextile is wrapped over the polymer mesh layer. In addition to the reduction of friction and shear transfer from the ground to the pipe or foundation element, which acts to protect the surface from damage due to earthquakes or land slippage, the low friction slip-sleeve wrap of the invention has several other advantages. The porosity of the geotextile allows for cathodic protection. The geogrids, geonets, and geotextile used in the wrap are relatively inexpensive and readily available. Moreover, the wrap can be applied in the field easily, with minimal time delay, and located as required along all or selected lengths of the pipeline or foundation element. Because the wrapping can be applied easily in sections, it also can be used on large conduits, including large diameter water pipelines (greater than 4 ft) and tunnels. This solution does not meet the impact protection requirements for pipeline protection. Also, the two-step installation process makes it time consuming and costly. Finally, the maximum width of the geonet being 8 ft does not allow for efficient unrolling of the sleeve onto the pipelines.

U.S. Pat. No. 6,773,774 (Micro-Perforated Polyethylene Encasement—2004) discloses an improved anti-corrosive material used to protect buried and submerged metallic structure such as conduits from corrosion. The anti-corrosive material is comprised of a layer of polyolefin having a plurality of micro perforations formed therein. The anti-corrosive material is preferably comprised of a low-density polyethylene having characteristically strong tensile strength and elongation properties to provide conventional protection from soil, water, air, or other potentially damaging elements. The micro perforations allow the anti-corrosive material to be utilized with cathodic systems to provide for a significant reduction in the amount of electrical current required to achieve cathodic protection. The present invention can be used to control corrosion without costly and easily damaged coatings or adhesives; and can be applied to metallic structures in the field prior to installation. The anti-corrosive material of the present invention may further comprise one or more antimicrobial additives incorporated therein to provide protection against microbiologically influenced corrosion. The polyolefin layer is too thin to protect adequately against impact. Moreover, the micro perforations are too small to allow moisture going through the polyolefin layer, prevent cathodic protection to efficiently protect the pipeline. Finally, should moisture penetrate the protective layer, it cannot circulate freely between the pipeline coating and the polyolefin layer.

U.S. Pat. No. 7,390,553 B2 (2008) relates to a perforated thermoplastic structure comprising at least a first layer and a plurality of perforations, which extend through the first layer. The perforations have a three-dimensional, preferably approximately conical or cylindrical shape. A second layer forms an inner surface of the shape, whereas the first layer forms an outer surface of the shape. The first layer contains a thermoplastic material, whose melting point is lower than a melting point of the thermoplastic material of the second layer. This patent is silent on the utility of the perforations stabilized by melting the sheet. The cylindrical shape limits or avoid the use of these sheets for allowing air to circulate under the sheet U.S. patent application published under No. US 2016/0327185 A1 (Perforated Wrap Covering for Protecting Coated Pipe—2016 (now abandoned)) discloses a perforated wrap-type covering protects coatings for buried pipes from damage by rocks and abrasive fill. The protective covering is a sheet of polymeric material, preferably 80 mil (2.03 mm) thick low density polyethylene, having an array of fluid communication perforations on one-inch centers, both longitudinally and laterally, and ranging in diameter from $1/16$ inch to $3/16$ inch (1.5 mm to 4.8 mm), to allow moisture to contact the coated pipe, and provide current paths between the coated pipe, through the soil and to sacrificial anodes. The protective covering, preferably has mounting holes which are spaced apart in rows which extend about respective circumferences of a pipe being coated. The protective covering is unrolled, then placed around the pipe so that the diameter of the pipe is perpendicular to the length of the covering, and then the opposed edges of the protective covering are secured via cable ties. However, the polyethylene material, especially when the ambient temperatures is high, tends to bond to the pipeline and the coating, preventing circulation of moisture between the coating and the polyethylene protective layer.

Despite the above prior art, there remains a need for a polymeric sheet with improved properties suitable for use in a number of applications. The present invention seeks to meet this and related needs.

SUMMARY OF THE INVENTION

The shortcomings of the prior art are generally mitigated by a new polymeric sheet (or membrane) that is perforated to create conjointly perforations and spacers adjacent thereto to provide a circulation space under the surface of the sheet.

The objective of the invention is to develop a product that will ensure proper protection of underlying structures, such as pipelines, from damage coming from above, such as scratches from stones, rocks or equipment, while ensuring moisture transmission through the protective product and moisture migration between the protective product and the underlying structure, to ensure proper conductivity of electrons circulating from the sacrificial anode to the ground to allow for cathodic protection of the underlying structure.

According to a preferred embodiment, the protective polymeric sheet comprises a plurality of holes going through the sheet and a plurality of spacers, each spacer being extending from a lower surface of the sheet adjacent to each hole.

According to a preferred embodiment, the protective sheet comprises a polymeric sheet made of a polymeric material, such as but not limited to polymeric materials known in the making of polymeric liners or geomembranes, including without limitation: Linear Low Density Polyethylene) LLDPE, High density Polyethylene (HDPE and Polyethylene for Raised Temperature (PERT).

The thickness of the sheet should be dictated by the performance of the material used to make the sheet. For instance, with LLDPE, the thickness is preferably of approximately 0.5-3.5 mm so as to ensure proper impact, tear and puncture protection for the underlying structure.

According to a preferred embodiment, the polymeric material has a conductive underside with a volume resistivity of 1-100 $\Omega \cdot m$, and preferably not greater or equal to 10 $\Omega \cdot m$ (as per ASTM D-4496) to facilitate the transmission of electron for the cathodic protection of the underlying structure.

According to a preferred embodiment, holes are punched into the protective sheet. The resulting holes may be of no less than about 3 mm diameter so as to ensure that the moisture can circulate through, and no more than about 5 mm, so as to prevent damage from the overburden of the protective material. The holes may be spaced apart by at least approximately 10-127 mm center to center (c/c) to ensure that sufficient polymeric material is present between the holes so as to prevent the damage of the underlying structure. They will be spaced apart by a distance no greater than 30 mm c/c to ensure that the maximum distance from a damage to a hole is preferably not greater than 15 mm, ensuring proper cathodic protection.

According to a preferred embodiment, the polymeric sheet has underlying spacers integrated into its structure of a given thickness (for instance of at least 2 mm), so as to allow for the moisture that has penetrated through the material to circulate freely between the underlying structure and the protective polymeric sheet. The protective polymeric sheet will be of sufficient width as to ensure protection around the entire circumference or perimeter of the underlying structure.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel polymeric perforated sheet will be described hereinafter. Although the invention is described in terms of specific illustrative embodiments, it is to be understood that the embodiments described herein are by way of example only and that the scope of the invention is not intended to be limited thereby.

Figure 1:
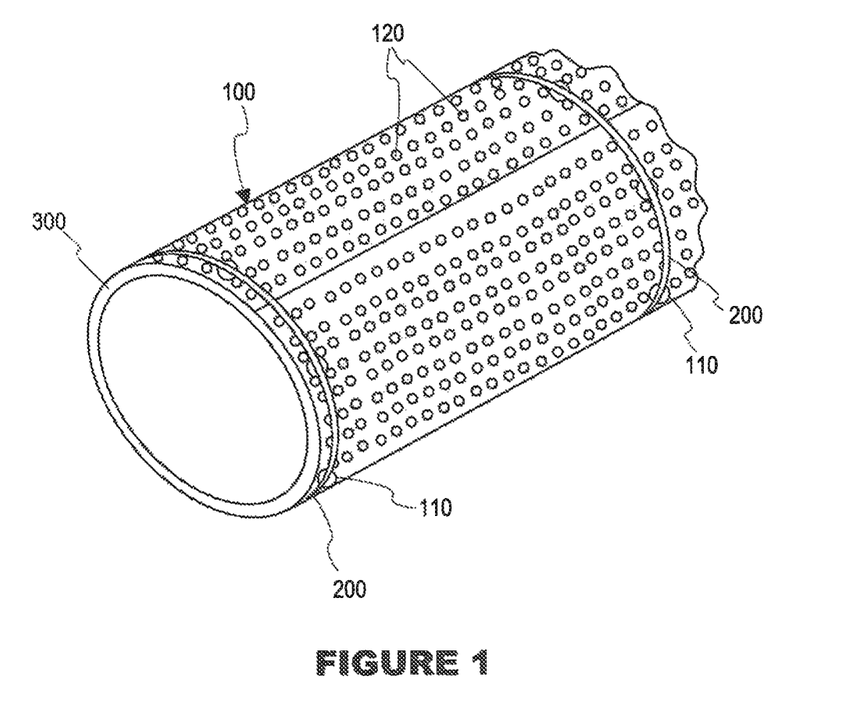
FIG. 1 illustrates a perforated sheet according to a preferred embodiment of the invention wrapping a pipeline.
Figure 3:
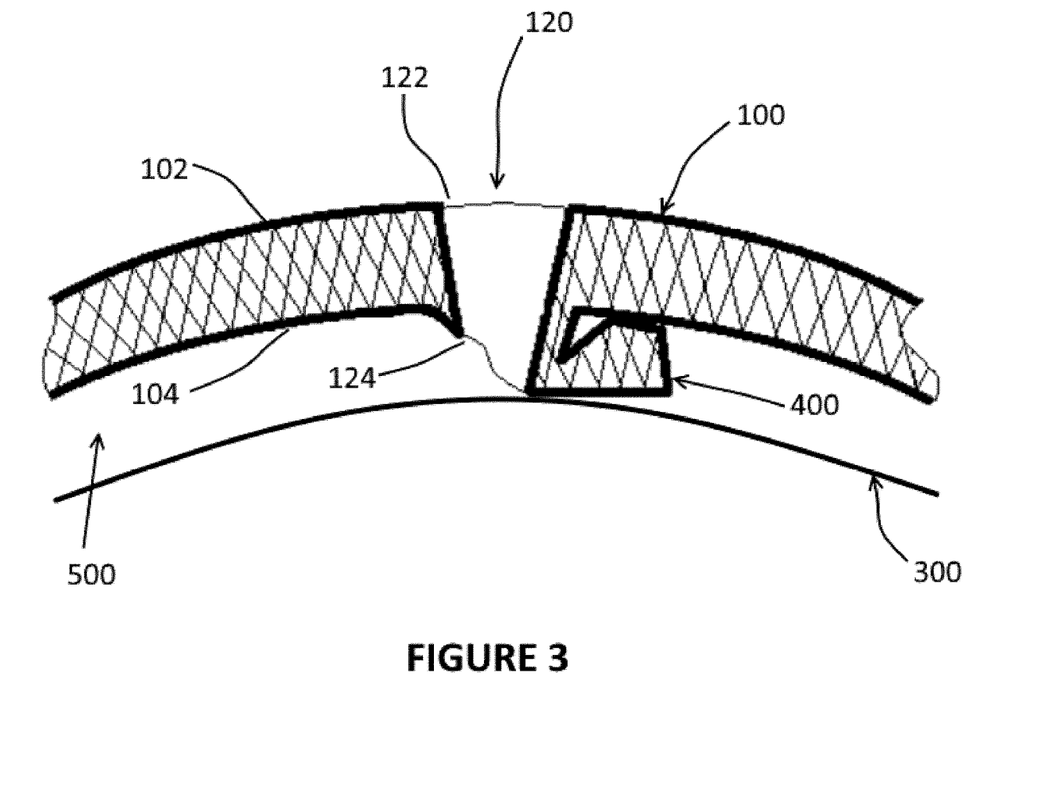
FIG. 3 is partial close view of a hole of the membrane having a truncated shape with adjacent spacer, in accordance with a preferred embodiment of the invention.

FIGS. 1 and 3 illustrate a perforated sheet 100 according to a preferred embodiment of the invention wrapping a pipeline 300. The sheet comprises a plurality of holes or perforations 120 preferably evenly spaced apart on the surface of the sheet. Fixing systems 110 can be used, such as at the ends of the pipes 200, to maintain the sheet around the pipe 300.

Figure 2:
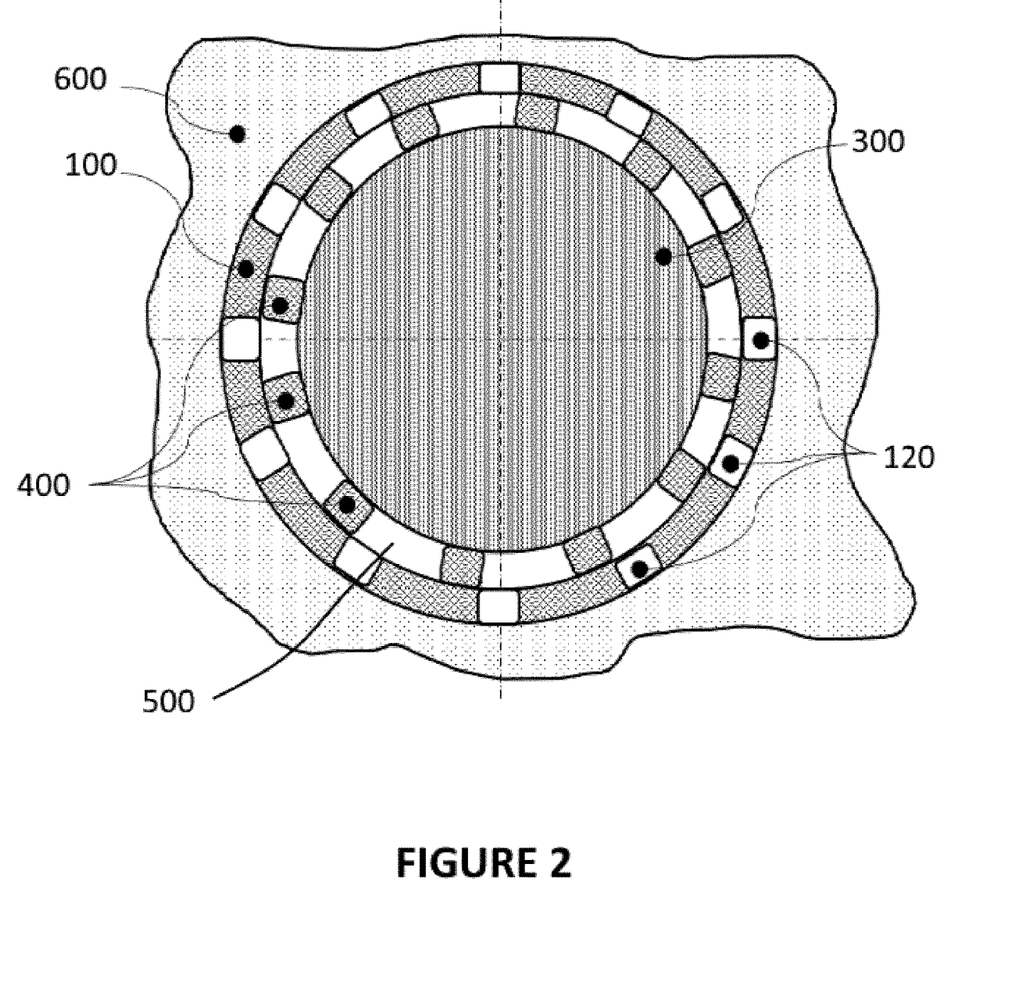
FIG. 2 is cross-sectional view of the wrapped pipeline illustrated on FIG. 1.

As illustrated in FIG. 2, the spacers 400 adjacent to the holes 120 allow maintaining a gap 500 between the pipe 300 and the sheet 100 providing air and moisture circulation between the pipe and the ground 600 in which the pipe can be buried.

As illustrated in FIG. 3, each hole 120 of the sheet 100 may have a truncated shape with the diameter of the hole 122 on the upper surface 102 of the sheet larger that the diameter of the hole 124 at the lower surface 104 of the sheet, so as to ensure better air and moisture circulation through the polymeric sheet. The spacer 400, adjacent to the hole 120 and extending from the lower surface 104 of the sheet 100 results from the creation of the holes in the sheet. The spacer 400 on one side only of the hole 120 combined with the thickness and resistance of the sheet 100 provide the gap 500 between the pipe 300 and the sheet 100.

In an illustrative example, the protective sheet is made preferably of a 1 mm-3 mm, more preferably about 2 mm thick sheet of Linear Low-Density Polyethylene (LLDPE with the following properties:

Sheet density of 0.920-0.960, more preferably ≤0.939 g/cm³ as per ASTM D-792;

Carbon black content of 0.5%-5%; more preferably of 2%-3% as per ASTM D-4218;

Tensile strength at break of 10-50, more preferably of ≥31 kN/m as per ASTM D-6693;
Elongation at break of 100%-1000%, more preferably of ≥400% as per ASTM D-6693;
Puncture Resistance of 250-1000 N, more preferably of ≥500 N as per ASTM D-500;
Volume Resistivity of 1-100 Ω·m, more preferably of ≤10 Ω·m as per ASTM D-4496; and
Impact Strength of 200-500 in/lbs, more preferably of ≥204 in/lbs as per ASTM G14.

According to a preferred embodiment, the protective sheet will be made of 1 to 9, more preferably of 3 layers of coextruded LLDPE with the bottom layer having a volume resistivity no greater than the above-mentioned specification.

According to a preferred embodiment, the protective sheet is perforated by holes spaced apart by about 2.5 cm (about 1 inch) in both axes (machine direction and cross direction). The holes may have a truncated cone shape, with the above diameter being approximately 5 mm (120) and the bottom diameter being about 3 mm (124) as to ensure water circulation through the geomembrane. Other distribution patterns for the perforated holes are possible and will generally be determined in accordance with the intended use or application of the protective polymeric sheet.

According to another illustrative embodiment, a nob of about 1-3.5 mm thick (depending on the polymer sheet thickness) acts as a spacer remaining attached to the protective sheet to ensure proper spacing and water circulation between the protective sheet and the element to be protected. Each nob will be at least about 1-5 mm in diameter.

Figure 9:
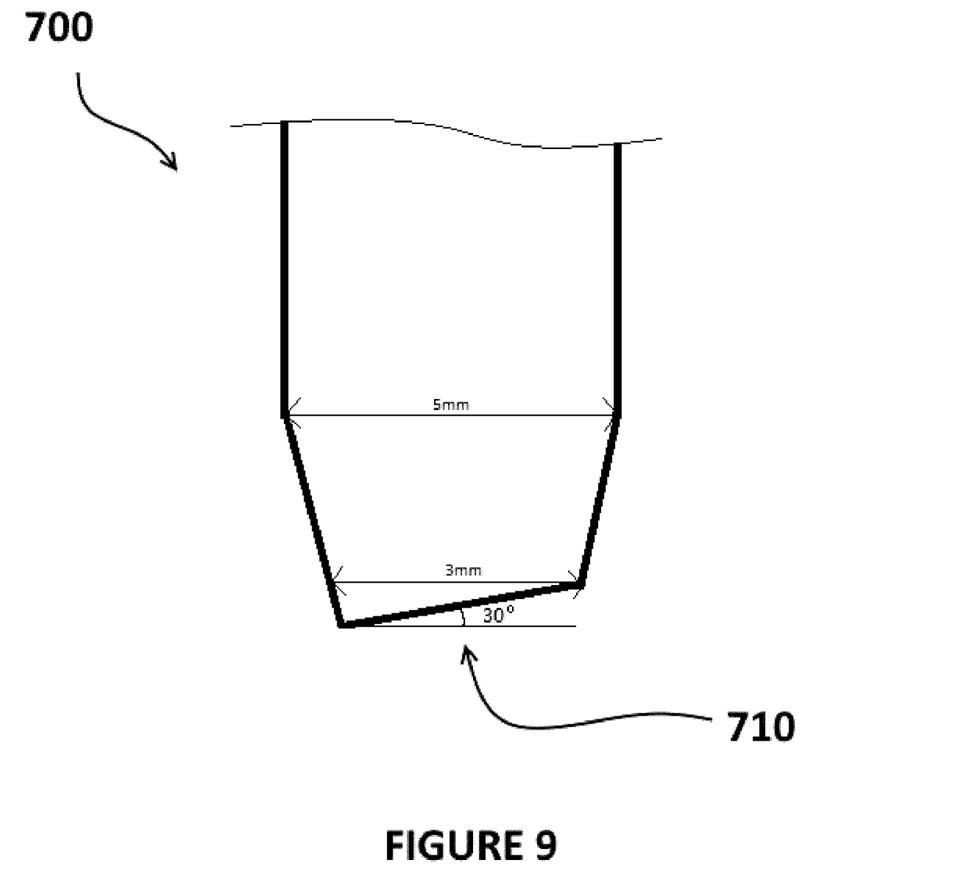
FIG. 9 is a cross sectional view of a punch with bevelled edge in accordance with a preferred embodiment of the invention.

According to a preferred embodiment, the holes can be punched with the proper equipment that will allow for proper dimensions to be obtained, normal pressure to perforate the above material and with a grinded edge to ensure that the attached spacers remain attached to the protective sheet. As illustrated on FIG. 9, an example of the equipment that could be used to perforate the protective sheet would be a machined punch 700 with a 30° bevelled edge 710 to ensure that the nob stays attached to the sheet. The punch may be activated by air pressure pistons pushing the punch through the protective sheet at an angle of about 90°. Other ways for activating a punch can be used.

The perforated protective sheet may be used for the protection of pipelines, but also for any applications where a breathable resistant membrane is needed, such as, but not limited to: heap leach for gold and mining industries; landscaping (sandbox; underline for paving stone; soil retains); greenhouse floor coverings; industrial and residential gutter cap (such as for avoiding leaf to block the gutter); filters, etc.

Figure 4:
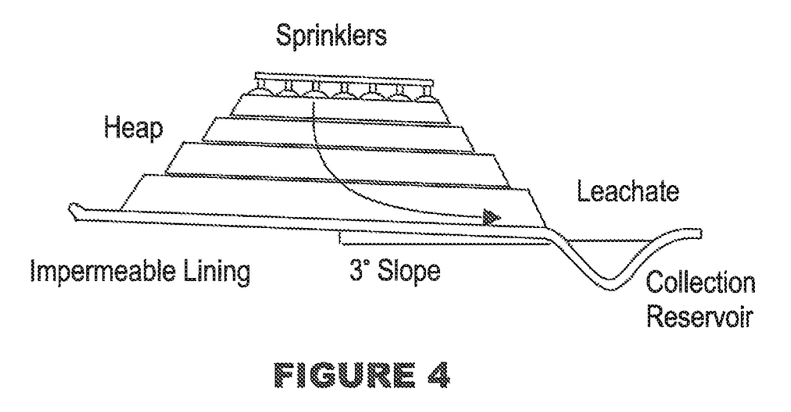
FIG. 4 illustrates the use of the perforated sheet in a heap leach application for gold and mining industries in accordance with a preferred embodiment of the invention.

Heap Leach Applications in the Mining Industry (FIG. 4):

The perforated polymeric sheet of the present invention may be used to extract metals (including gold, silver, nickel, copper and uranium) through heap leaching. The perforated sheet may replace geotextiles that are currently in use and offer a more durable solution.

Figure 5:
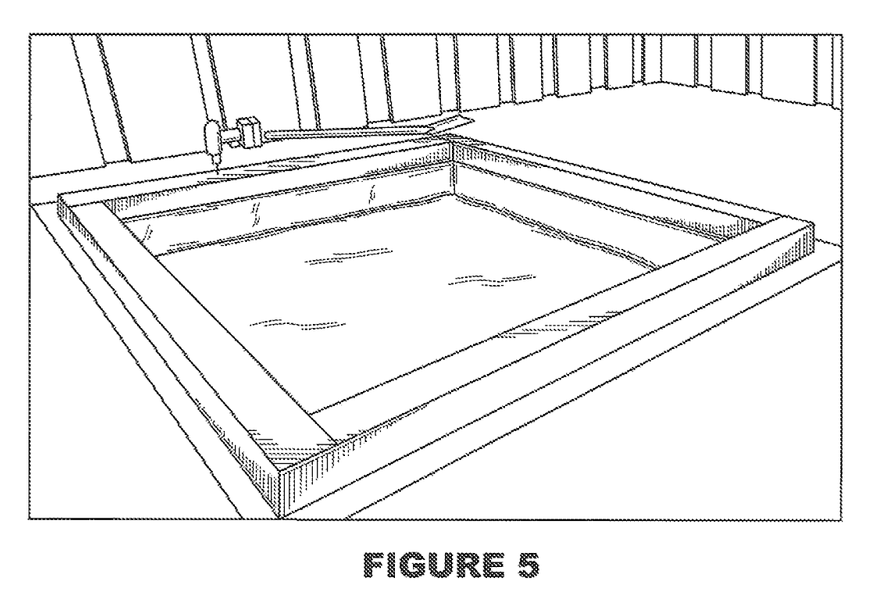
FIG. 5 illustrates the use of the perforated sheet in a sand box in accordance with a preferred embodiment of the invention.

A Sandbox (FIG. 5):

The perforated sheet according to the present invention can contain the sand but let the water go.

Underlining Paving Stones:

The perforated sheet according to the present invention can contain the backfield under the stones, preventing weeds from growing through the stones while allowing water flow.

Figure 6:
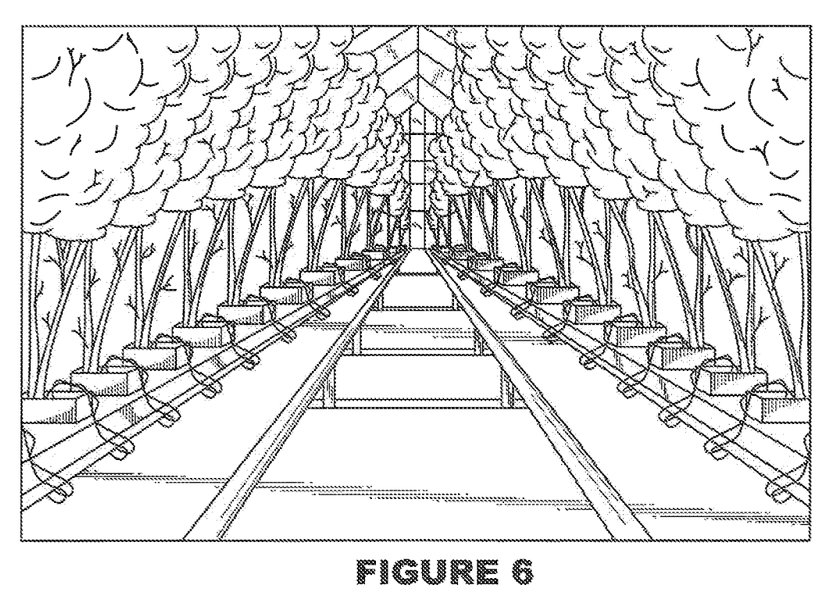
FIG. 6 illustrates the use of the perforated sheet for covering the ground of a greenhouse in accordance with a preferred embodiment of the invention.
Figure 7:
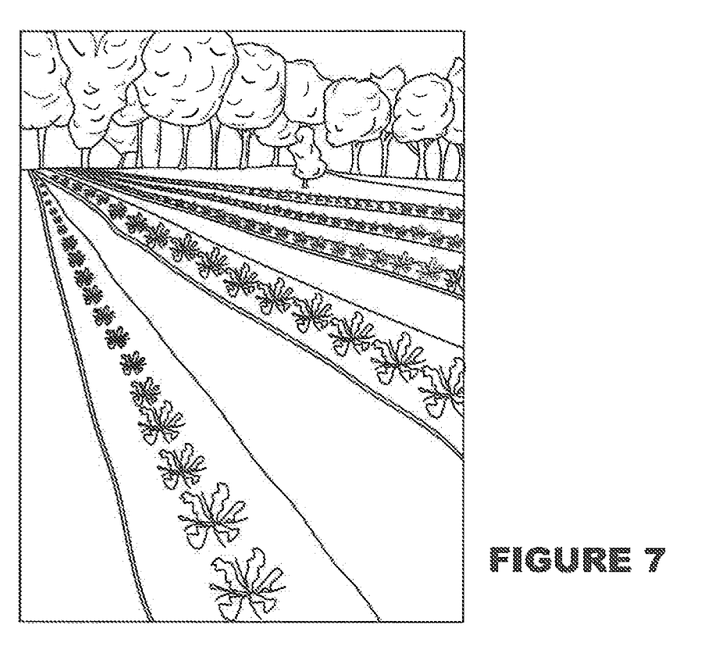
FIG. 7 illustrates the use of the perforated sheet in agriculture in accordance with a preferred embodiment of the invention.

Greenhouse Floor Covering (FIG. 6) and in Agriculture (FIG. 7):

In most countries, water is costly. In agriculture, water is often a key expense. In greenhouses, it is customary recover water following the watering of plants. However, occasionally the floor in a greenhouse is uneven and water tends to gather in pools. The perforated sheet according to the present invention can serve as a water collecting system, as it is suitable for use as a water drainage system. Additionally, the outer layer of the protective polymeric sheet may be painted in accordance with methods known to those of skill in the art. For example, in a greenhouse, the protective polymeric sheet may be colored green to blend in with the floor.

Figure 8:
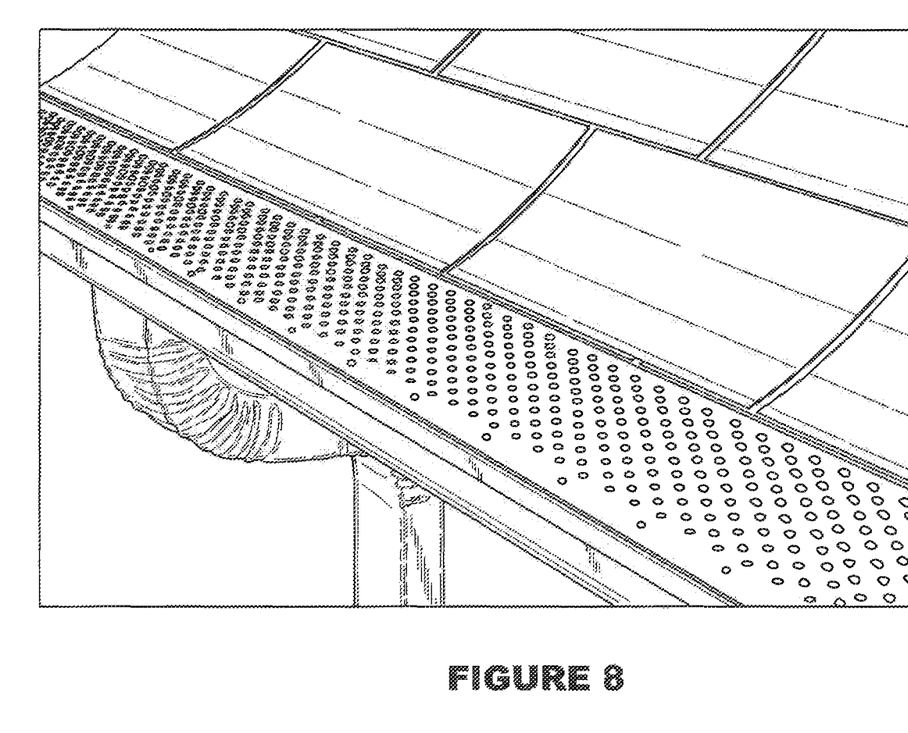
FIG. 8 illustrates the use of the perforated sheet for covering a gutter, in accordance with a preferred embodiment of the invention.

Industrial and Residential Gutter Cap (FIG. 8):

to avoid leaf blocking the gutters): to create a sort of deflector to block debris from entering the gutters but lets the water go trough.

The protective polymeric sheet of the present invention may further include attachment means allowing the sheet to be readily installed and more easily secured in certain applications. These attachment means may be added at the end of the manufacturing process of the polymeric sheet. For example, in one embodiment, fasteners are inserted in the polymeric sheet at regular intervals in the manufacturing of a final polymeric sheet product. Having the fasteners integral to the polymeric sheet makes the installation of the polymeric sheet around pipeline easier when on site.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A protective polymeric sheet comprising:
 a) a layer consisting of a polymeric material having an upper surface and a lower surface; and
 b) a plurality of perforations with nobs on only one side of the perforations that remain attached to the lower surface of the polymeric layer, each of said nobs comprising the polymeric material punched from said layer to create said perforations whereby
  each of said nobs remains attached to only one side of its associated perforation, and
  each of said nobs are beneath said layer lower surface and clear of its associated perforation.

2. The protective polymeric sheet of claim 1, wherein the polymeric sheet has a thickness between about 0.5 to 3.5 mm.

3. The protective polymeric sheet of claim 2, wherein the polymeric material is Linear Low-Density Polyethylene (LLDPE), High Density Polyethylene (HDPE) or Polyethylene for Raised Temperature (PERT).

4. The protective polymeric sheet of claim 3 having the following properties:
 a) Sheet density of 0.920-0.960 g/cm$^3$;
 b) Carbon black content of 0.5%-5%;
 c) Tensile strength at break of 10-50, kN/m;
 d) Elongation at break of 100%-1000%;
 e) Puncture Resistance of 250-1000 N;
 f) Volume Resistivity of 1-100 Ω·m; and
 g) Impact Strength of 200-500 in/lbs.

5. The protective polymeric sheet of claim 4 having the following properties:
 a) Sheet density of ≤0.939 g/cm$^3$;
 b) Carbon black content of 2%-3%;
 c) Tensile strength at break of ≥31 kN/m;
 d) Elongation at break of ≥400%;

e) Puncture Resistance of ≥500 N;
f) Volume Resistivity of ≤10 Ω·m; and
g) Impact Strength of ≥204 in/lbs.

6. A protective polymeric sheet according to claim 1 comprising 3 to 9 layers.

7. The protective polymeric sheet of claim 6 wherein the polymeric material is co-extruded Linear Low-Density Polyethylene (LLDPE), High Density Polyethylene (HDPE) or Polyethylene for Raised Temperature (PERT).

8. The protective polymer sheet of claim 7, wherein the protective polymer sheet consists of 3 layers of coextruded Linear Low-Density Polyethylene (LLDPE) and wherein the bottom layer has a maximum volume resistivity of 100 Ω·m.

9. The protective polymeric sheet of claim 1, wherein the perforations have a diameter between about 3 and 5 mm.

10. The protective polymeric sheet of claim 9, wherein the perforations are spaced apart by about 10 mm to about 127 mm.

11. The protective polymeric sheet of claim 10, wherein the perforations are evenly spaced.

12. The protective polymeric sheet of claim 11, wherein the nobs are 1-3.5 mm thick and about 1-5 mm in diameter.

13. A protective polymeric sheet as defined in claim 1 further comprising means to attach said polymeric sheet to a structure when in use.

14. A protective polymeric sheet as defined in claim 13 for use with pipelines.

15. A polymeric sheet for protecting an exposed surface, comprising:
    a polymeric layer having an upper surface and a lower surface;
    an array of perforations through and spaced around said polymeric layer; and
    nobs attached to the lower surface of the polymeric layer;
    wherein each perforation has a bottom opening with one of said nobs on only one side of its bottom opening and beneath said layer lower surface.

16. The polymeric sheet of claim 15, wherein said nobs comprise polymeric material punched from said polymeric sheet when forming said perforations.

17. A surface protected by the polymeric sheet of claim 15, wherein said polymeric sheet lower surface is adjacent said exposed surface with said nobs spacing said polymeric sheet lower surface from said exposed surface whereby said perforations are open to said space between said exposed surface and said polymeric sheet lower surface.

18. The protective polymeric sheet of claim 1, wherein said perforations are truncated with an opening through said sheet upper surface larger than its opening through said sheet lower surface.

19. The polymeric sheet of claim 15, wherein said perforations are truncated with an opening through said sheet upper surface larger than its opening through said sheet lower surface.

20. A protected object, comprising:
    an object; and
    a protective polymer sheet according to claim 1, wherein each polymeric material punched from said layer is (i) between said layer and said object and (ii) clear of said its associated perforation,
    the perforations define a path from an upper opening in said perforation upper surface to a lower opening in said perforation lower surface, and
    said each of said nobs supports said sheet so that said lower opening is spaced from said object.

* * * * *